United States Patent
Brunberg et al.

(10) Patent No.: US 9,399,436 B2
(45) Date of Patent: Jul. 26, 2016

(54) SOUND REDUCTION SYSTEM

(71) Applicant: VOLVO CAR CORPORATION, Gothenburg (SE)

(72) Inventors: Johan Brunberg, Molndal (SE); Niclas Bratt, Jorlanda (SE); Christopher Henriksson, Gothenburg (SE); Bo Larsson, Molndal (SE)

(73) Assignee: VOLVO CAR CORPORATION (SE)

( * ) Notice: Subject to any disclaimer, the term of this patent is extended or adjusted under 35 U.S.C. 154(b) by 0 days.

(21) Appl. No.: 14/525,475

(22) Filed: Oct. 28, 2014

(65) Prior Publication Data
US 2015/0129352 A1   May 14, 2015

(30) Foreign Application Priority Data
Nov. 8, 2013 (EP) .................................... 13192055

(51) Int. Cl.
*B60R 13/08* (2006.01)
*G10K 11/16* (2006.01)
*G10K 11/00* (2006.01)

(52) U.S. Cl.
CPC .......... *B60R 13/0846* (2013.01); *G10K 11/002* (2013.01); *G10K 11/161* (2013.01)

(58) Field of Classification Search
CPC ............... G10K 11/002; G10K 11/161; B60R 13/0846; F02M 35/10295; F02M 35/12; F01N 1/082; F01N 1/24; F01N 1/10
USPC .......................... 181/224, 229, 252, 256, 258
See application file for complete search history.

(56) References Cited

U.S. PATENT DOCUMENTS

| | | | | |
|---|---|---|---|---|
| 1,575,657 | A * | 3/1926 | Straussler | F01N 1/082 181/258 |
| 4,408,679 | A * | 10/1983 | Littrell | 181/243 |
| 5,007,499 | A * | 4/1991 | Ebbing et al. | 181/258 |
| 5,140,819 | A | 8/1992 | Napier et al. | |
| 5,783,780 | A | 7/1998 | Watanabe et al. | |
| 6,688,425 | B2 * | 2/2004 | Cole et al. | 181/264 |
| 7,631,726 | B2 * | 12/2009 | McWilliam et al. | 181/258 |
| 8,146,706 | B2 * | 4/2012 | Katoh et al. | 181/224 |
| 8,307,947 | B2 * | 11/2012 | Bussow | 181/224 |
| 8,459,407 | B2 * | 6/2013 | Jangili | 181/224 |
| 2003/0173146 | A1 * | 9/2003 | Wolf et al. | 181/224 |
| 2004/0089500 | A1 * | 5/2004 | Lewis | 181/249 |
| 2009/0200103 | A1 * | 8/2009 | Potschka | 181/224 |
| 2011/0168482 | A1 * | 7/2011 | Merchant et al. | 181/213 |

FOREIGN PATENT DOCUMENTS

| | | |
|---|---|---|
| WO | 9209988 A1 | 6/1992 |
| WO | 9727370 A1 | 7/1997 |

OTHER PUBLICATIONS

Extended European Search Report Dated Apr. 3, 2014, Appliation No. 13192055.5-1559—Applicant Volvo Car Corporation, 7 Pages.

* cited by examiner

*Primary Examiner* — Jeremy Luks
(74) *Attorney, Agent, or Firm* — Brooks Kushman P.C.

(57) ABSTRACT

The disclosure relates to a sound reduction system comprising a sound reduction device. The sound reduction device comprises a sound reducing material. The system further comprises a channel wherein a gaseous medium is arranged to flow. The sound reduction device is mounted inside the channel, thereby placing the sound reducing material inside the channel.

18 Claims, 4 Drawing Sheets

SOUND REDUCTION SYSTEM

CROSS-REFERENCE TO RELATED APPLICATIONS

This application claims foreign priority benefits under 35 U.S.C. §119(a)-(d) to European patent application number EP 13192055.5, filed Nov. 9, 2013, which is incorporated by reference in its entirety.

TECHNICAL FIELD

The disclosure relates to a sound reduction system comprising a sound reduction device. The sound reduction device comprises a sound reducing material. The system further comprises a channel wherein a gaseous medium is arranged to flow. The disclosure further relates to a method for reducing sound.

BACKGROUND

Noise is a big source of concern in today's society. Various types of machines emit sounds of various frequencies. Certain frequencies louder than a certain decibel level are considered noise and must due to for instance regulations be removed or reduced to below an allowable decibel level.

One example of such a machine is any type of engine, pump or similar machine emitting sound which is considered noise which cannot be dampened or absorbed with standard sound absorbing or sound reducing means, such as resonators or insulation. This sound can be transported to various parts of the engine and also to parts separate from the engine through equipment attached to the engine.

This problem can for instance be found in high performance engines which may emit high amplitude sound over a wide range of frequencies. In some cases it is not possible to absorb sound by enveloping the engine or the structure emitting the sound with sound reducing or sound absorbing materials due to space constraints. In other cases cost reduces the possibility to absorb sound, because having much isolation material around ducts is expensive, especially in part price.

These problems can be found in for instance vehicles, ventilation systems or processing plants where gaseous media is transported.

There is thus a need for an improved sound reduction system which can address the above mentioned problems.

SUMMARY

An object of the present disclosure is to provide a sound reduction system where the previously mentioned problems are avoided.

The disclosure relates to a sound reduction system comprising a sound reduction device. The sound reduction device comprises a sound reducing material. The system further comprises a channel wherein a gaseous medium is arranged to flow. The sound reduction device is mounted inside the channel, thereby placing the sound reducing material inside the channel.

By placing a sound reduction device comprising a sound reducing material inside the channel, the effect is that sound reducing material is placed inside the channel. This leads to that sound propagating in the gaseous medium inside the channel can be reduced. This is advantageous when, as described above, there is no room for additional sound reducing or sound absorbing systems or devices which needs to be placed on the outside of the channel.

The channel may for instance be an air intake duct on a vehicle engine, a ventilation duct in a ventilation system or a pipe in which a gaseous medium flows in for instance a processing plant such as a refinery or a paper mill. The system according to the disclosure may also be advantageous if changes to for instance an engine, fan or pump design lead to that the frequency spectrum in the generated sound is changed and all frequencies cannot be reduced in the current design.

The sound reduction device can be adapted to dampen and/or absorb sound over a narrow frequency range or a large frequency range depending on the type and design of sound reducing material used in the sound reduction device.

The sound reduction device may comprise a supporting structure and a frame arranged to be supported by the supporting structure. The sound reducing material is placed in the frame. By having a supporting structure the sound reduction device can be allowed to be fitted to variety of different channels with different cross section areas and geometries. The frame comprises the sound reducing material and is supported by the supporting structure which allows for an easy placement of the sound reducing material inside the channel.

The supporting structure of the sound reduction device may be a closed structure. The frame may be placed in the supporting structure such that the sound reducing material is located inside the supporting structure. In order to allow for a secure mounting of the sound reduction device, the supporting structure can take the shape of a closed structure. With closed structure means a structure which for instance is circular, oval, rectangular or any similar shape. A closed structure provides for a better structural integrity of the supporting structure. The supporting structure may of course be open, such as for instance taking the shape of a semi-circle, a semi-oval or a semi-rectangle and similar shapes.

The supporting structure may comprise a collar. The collar is a part of the supporting structure which is wider than the remainder of the supporting structure. The collar can for instance take the shape of an elevated rim on the supporting structure. The collar ensures that the sound reduction device stays in place when mounted and prevents the sound reduction device from becoming dismounted from its intended mounting location.

The sound reduction device may be removably mounted inside the channel. The sound reduction device may be securely mounted inside the channel for instance by welding, gluing or by any other means of attaching the sound reduction device to the channel. In some cases it is more advantageous for the sound reduction device to be removably mounted inside the channel. This is advantageous as the sound reducing material can be examined and replaced if necessary during maintenance of the system. It is also advantageous if any part of the sound reduction device has been damaged. The collar may allow for an easy removal of the sound reduction device as it may be undesirable to grab for instance the frame in order to remove the sound reduction device.

The sound reducing material may be a solid member placed in the frame and/or the sound reducing material may comprise a fiber mat placed in the frame. Depending on the type of sound being generated the sound reduction device can be adapted accordingly by changing the type of sound reducing material placed in the frame.

If reduction of sound in a narrow spectrum of frequencies is desired a solid member can be placed in the frame.

This has the effect that sound with certain frequencies is effectively reduced as the solid member reduces the diameter of the channel and thereby creates reflection that reduces standing sound waves of certain frequencies.

Thus, sound with certain wavelengths is reduced when they the sound reduction device.

If a wider frequency spectrum of sound is to be reduced a fiber mat can be placed in the frame. A fiber mat is fiber material formed into a desired shape. The fiber mat effectively absorbs the sound energy of the sound frequencies and converts these to heat inside the fiber mat thereby reducing the sound energy of these frequencies.

The frequencies reduced is determined by the choice of sound reducing material, i.e., solid member or fiber mat; the volume of the frame, i.e., the amount of material placed in the frame; and the area of the frame. Other characteristics related to volume and area such as length of the frame and the width of the frame can be used to tune the frequency spectrum targeted. The solid member and the fiber mat can be used alone or in combination. If used in combination one solid member can be placed together with a fiber mat or one solid member can be sandwiched between two fiber mats. Other combinations of solid members and fiber mats are of course conceivable.

The sound reduction device may further comprise a fastening arrangement attached to the frame, thereby keeping the sound reducing material from escaping from the frame. Depending on the type of sound reducing material used in the frame a fastening arrangement may be used in order to ensure that the sound reducing material stays in the frame. This is primarily used when a fiber mat is used.

The sound reduction device may be arranged to be disassembled. In order to be able to change the sound reducing material it is advantageous to be able to disassemble the sound reduction device. This removes the need for changing the complete sound reduction device when a different spectrum of frequencies is desired to be reduced. For instance, an entire frame can be replaced by a frame having a different sound reducing material or the frame itself can be disassembled and the sound reducing material replaced. The frame is then reinserted into the supporting structure and the sound reduction device is ready for installation.

The sound reducing material may be one of or a combination of plastic, metal, glass fiber, polar fleece or polyurethane. In case of a solid member the plastic or metal may be perforated in order to change the characteristics of the sound reduction. One such example of micro-perforated plates and their manufacture is described in WO 97/27370.

The frame may be aerodynamically shaped such that the pressure drop of the gaseous medium over the frame is reduced. As the sound reduction device is placed in the path of a flowing gaseous medium a pressure drop will be experienced when the gaseous medium passes the sound reduction device. In order to reduce the pressure drop the sound reduction device is made to take an aerodynamical shape. A cross-section along the length direction of the frame may for instance be wing-shaped. The sound reduction device may also follow the shape of the channel if the channel is not straight where the sound reduction device is mounted.

The supporting structure and frame may be made of a plastic and/or a metal such as aluminum or stainless steel, the supporting structure and frame preferably being made of the same material as the channel in which it is placed. Having the sound reduction device and the channel made of the same material is preferable as wear will be similar to the channel and the sound reduction device. Galvanic risks are also reduced by having the same material, especially for metal wear or design. This for instance leads to that service intervals will not have to be determined by material wear in the sound reduction device.

The pressure of the gas in the channel can be above atmospheric pressure, at atmospheric pressure or below atmospheric pressure. The sound reduction system can thus be used in any kind of pressure conditions in the channel.

The system according to the disclosure can be placed in a vehicle where the channel in which the sound reduction device is placed is an air intake channel in the engine.

The disclosure further relates to a method for reducing sound in a channel wherein a gaseous medium flows. The method comprises:

providing a sound reduction device comprising a sound reducing material;

mounting the sound reduction device inside the channel, thereby placing the sound reducing material inside the channel.

The method may further comprise:

removably mounting the sound reduction device is inside the channel.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
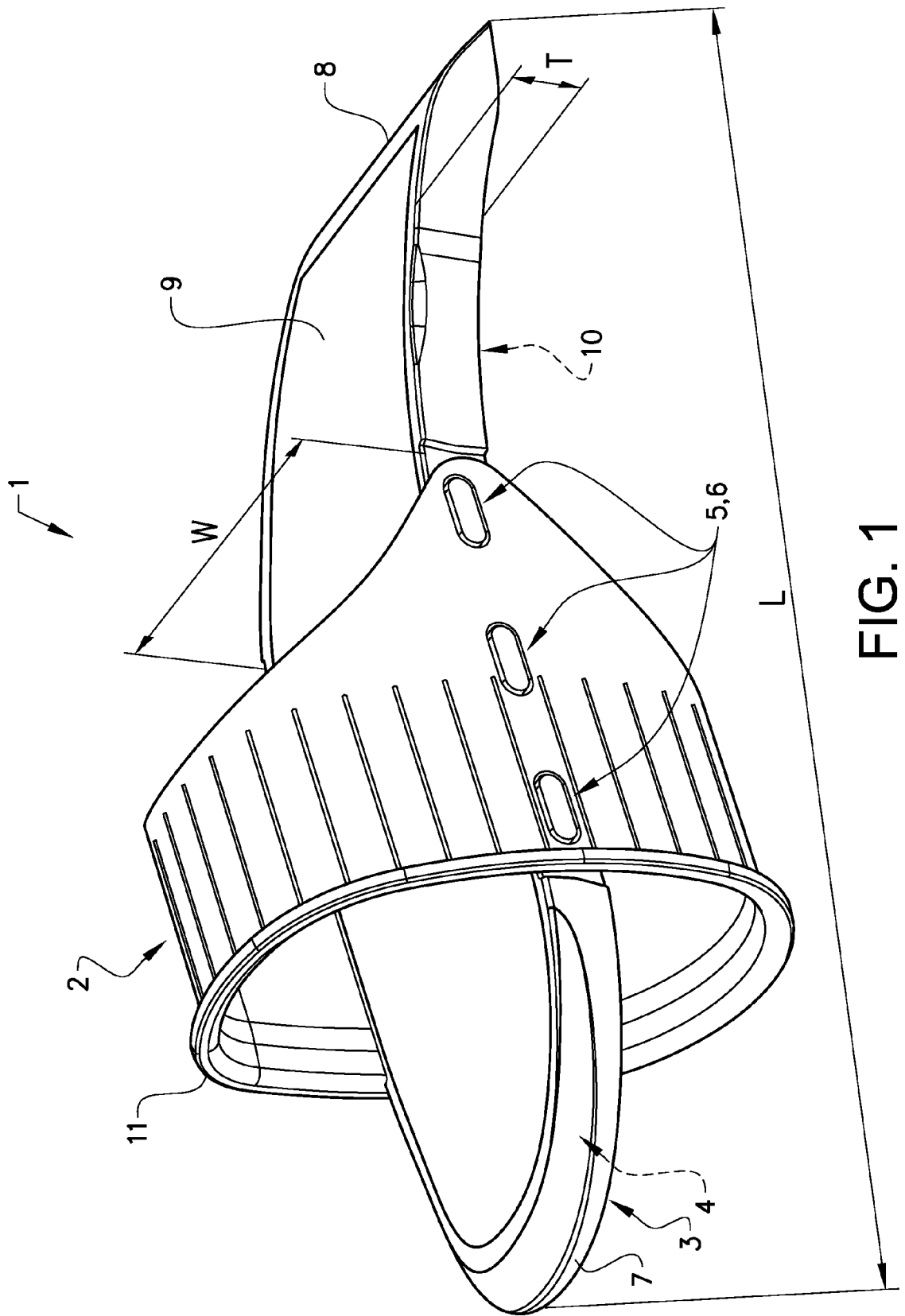
FIG. 1 schematically shows a sound reduction device according to the disclosure.

FIG. 1 schematically shows a sound reduction device 1 used in a sound reduction system (not shown) according to the disclosure. The sound reduction device 1 comprises a supporting structure 2 and a frame 3. The frame 3 is arranged to be supported by the supporting structure 2. A sound reducing material 4 is placed in the frame 3. The sound reduction device 1 further comprises fastening means 5 arranged to secure the frame 3 to the supporting structure 2 by means of interacting with openings 6 in the supporting structure 2.

The frame 3 has a length L measured from a frame front edge 7 to a frame rear edge 8. The frame 3 further has a thickness T measured from a top side 9 of the frame 3 to a bottom side 10 of the frame 3 and a width W measured in a direction perpendicular to both the thickness T and the length L. The length L, thickness T and width W determines the area and volume of the frame 3. The area and volume are adapted depending on which frequencies are desired to reduce. The thickness T can be the same over the entire length L of the frame or vary over the entire length L. Similarly the width W can be the same over the entire length L and/or thickness T or vary over the length L and/or thickness T.

In FIG. 1 the frame 3 is supported by the supporting structure 2 such that the sound reducing material 4 is located inside the supporting structure 2. It is possible to have other configurations wherein the frame 3 is supported by the supporting structure 2 such that the sound reducing material 4 is located outside of the supporting structure 2. The supporting structure 2 in FIG. 1 is closed and is essentially oval shaped.

The supporting structure 2 further comprises a collar 11 located along a front edge ( ) of the supporting structure 2. The collar 11 is a portion of the supporting structure 2 which has a larger circumference than the remaining supporting structure 2.

As can be seen from FIG. 1, the frame 3 is aerodynamically shaped with a cross section in the shape of an airfoil or wing. The frame 3 may be curved as in FIG. 1, but it may also be straight depending on the desired characteristics of the frame 3.

Figure 2:
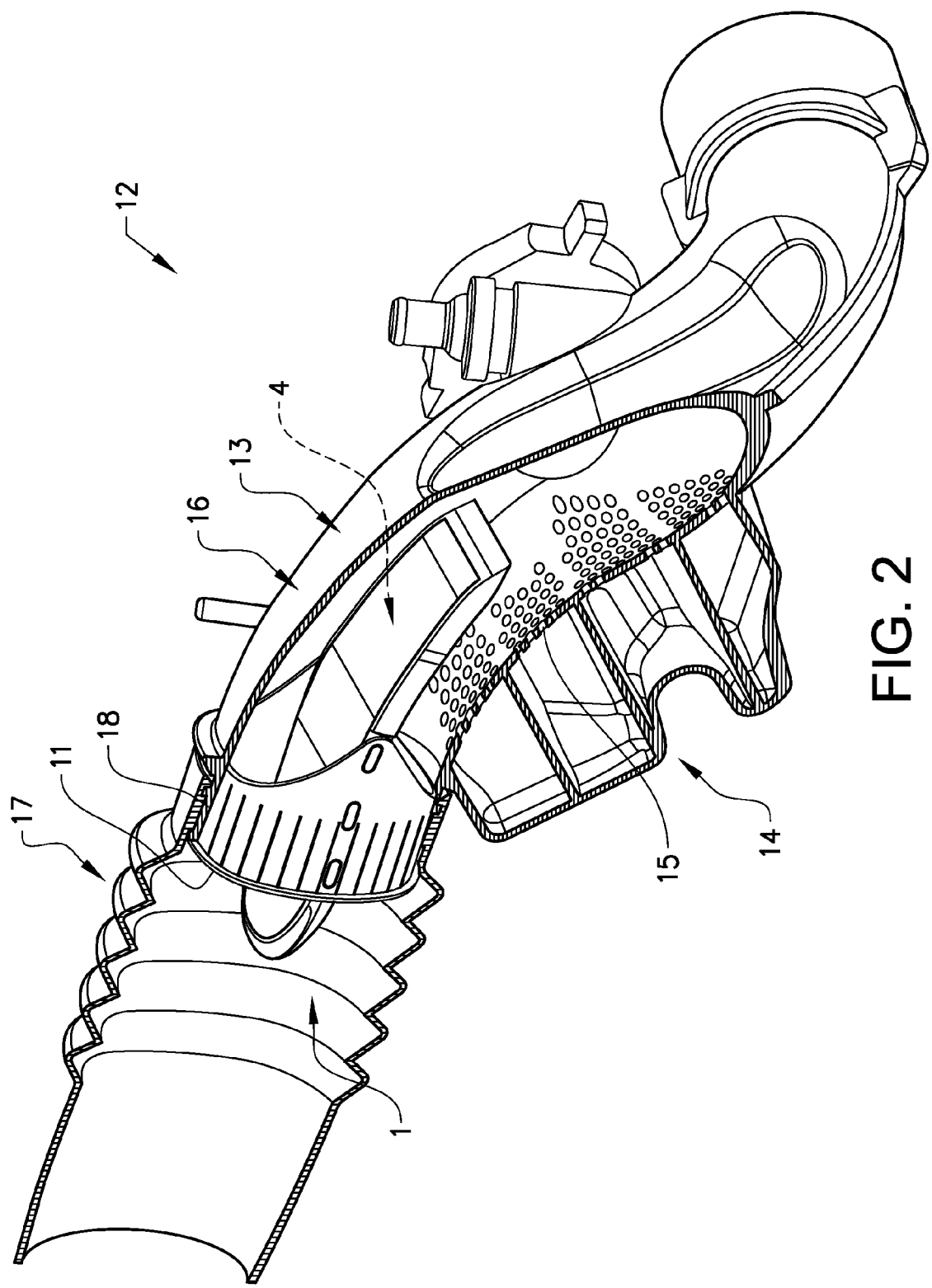
FIG. 2 schematically shows a sound reduction system according to the disclosure.

FIG. 2 schematically shows a sound reduction system 12 according to the disclosure. The sound reduction system 12 comprises a channel 13 and a sound reduction device 1 mounted inside the channel 13. This particular system is taken from a vehicle engine (not shown) where the channel 13 is an air intake channel. The sound reduction device 1 is placed after the air filter (not shown), i.e. the gaseous medium is in this case clean air. The sound reduction device 1 is placed before a compressor (not shown) in the clean air system of the engine. Further illustrated in FIG. 2 is a resonator 14 with resonator openings 15. As can be seen the sound reduction device 1 is placed inside the channel 13 such that it does not interfere with the resonator openings 15 thereby complementing already present sound reducing components of the engine.

The channel 13 in FIG. 2 comprises a first channel part 16 and a second channel part 17. In FIG. 2 the first channel part 16 is enclosed by the second channel part 17. The sound reduction device 1 is mounted in the channel 13 such that the collar 11 rests against a first channel part edge 18. This arrangement allows for the sound reducing material 4 to be placed in the desired location in the channel 13. The location of the sound reducing material 4 in the channel 13 is determined by the shape of the channel 13 and the location of other sound reducing components. Adapting the supporting structure 2 and the placement of the sound reducing material 4 in relation to each other are adaptations which fall well within the scope of the disclosure.

As can be seen from FIG. 2 the frame 3 follows the curved shape of the channel 13 as well as having a cross section which is aerodynamic. This ensures that a low pressure drop is achieved over the sound reduction device 1. The frame 3 is placed horizontally in the channel 13 in FIG. 2. This is merely an example of an orientation of the frame 3. Depending on the layout of for instance other sound reducing components, the frame 3 can be oriented vertically or at an angle between horizontally and vertically.

Figure 3:
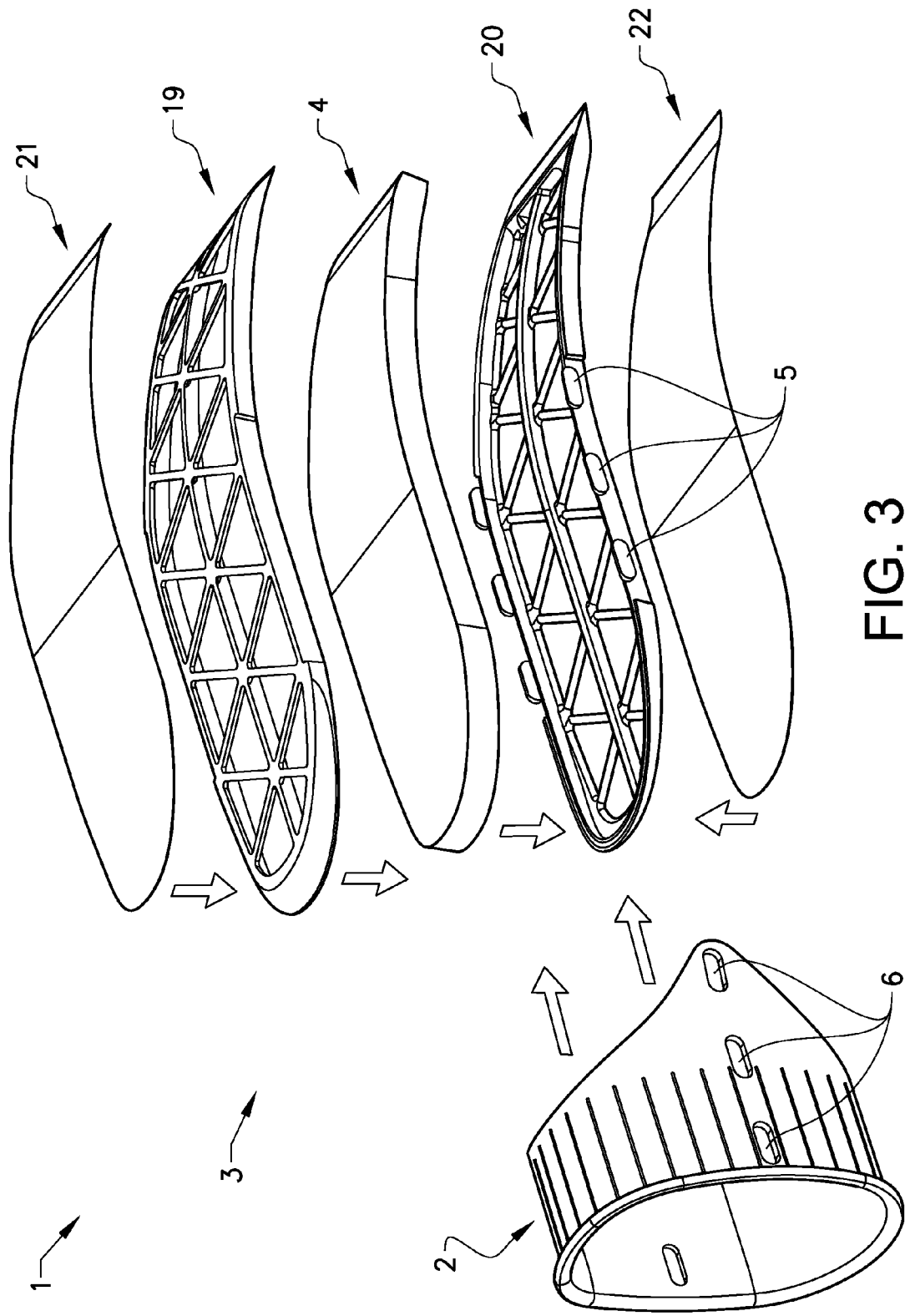
FIG. 3 schematically shows an exploded view of a sound reduction device according to the disclosure.

FIG. 3 schematically shows an exploded view of a sound reduction device 1 according to the disclosure. FIG. 3 illustrates how the sound reduction device 1 is assembled and similarly can be disassembled. The frame 3 comprises a first frame part 19 and a second frame part 20 in between which a sound reducing material 4 is placed. This is in this example illustrated by a solid member. The first frame part 19 and second frame part 20 are after being assembled optionally covered by a first fastening arrangement 21 and a second fastening arrangement 22. The first fastening arrangement 21 and second fastening arrangement 22 are, as described above mainly used when a fiber mat is placed in between the first frame part 19 and second frame part 20. After assembly of the frame 3, the frame 3 is inserted into the supporting structure 2. Fastening means 5 on the frame 3 may form for instance a snap-in connection with the corresponding openings 6 on the supporting structure 2. The supporting structure 2 is preferably flexible such that it expands when the frame 3 is inserted, thereby ensuring a secure snap-in fit with the frame 3. The fastening means 5 comprises in this example three protrusions on each longitudinal side interacting with corresponding openings on the supporting structure 2. The fastening means 5 may alternatively take the shape of rails or a similar elongated protrusion on the frame 3 and a corresponding elongate slit on the supporting structure 2. The sound reduction device 1 can be disassembled in the reverse order.

The fastening means 5 can alternatively to a snap-in connection be melted or welded, depending on the material of the supporting structure 2 and frame 3, to firmly secure the frame 3 to the supporting structure 2. The first frame part 19 and second frame part 20 can similarly be assembled securely by melting or welding, or have frame fastening means (not shown) which allows disassembly of the frame 3.

Figure 4:
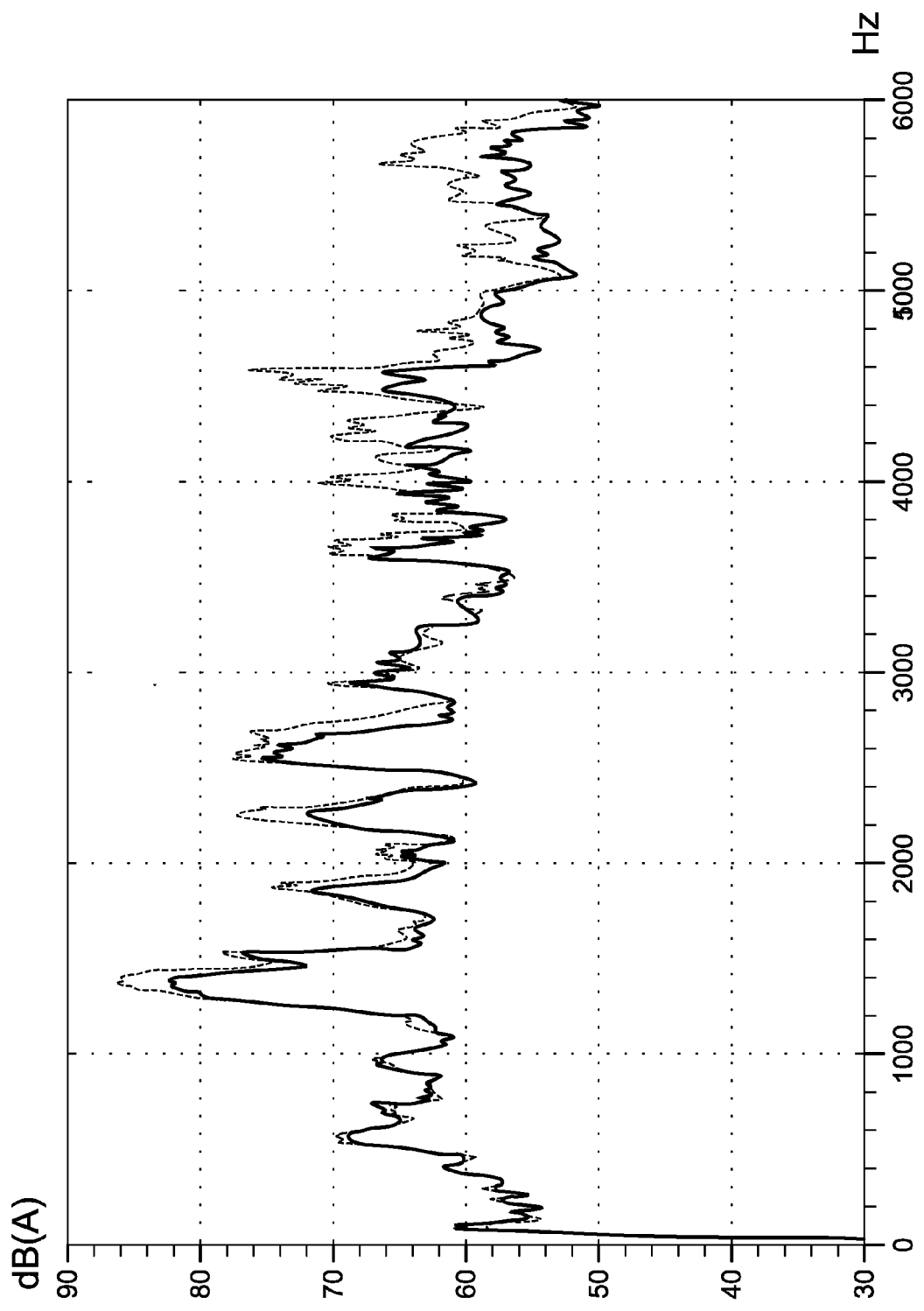
FIG. 4 schematically shows the effect of the sound reduction system in an engine with the system installed compared to an engine without the system.

FIG. 4 schematically shows a diagram showing the effect of the sound reduction system 12 in an engine with the system installed compared to an engine without the system. The x-axis in the diagram represents frequency measured in Hz. The y-axis represents the measurement of the sound pressure measured in dB(A). The dashed line indicates measurements made without the sound reducing system. As can be seen for some frequencies around 2200 Hz and 2500 Hz the sound pressure exceeds 100 dB(A). The solid line represents measurements made with the sound reduction system 12. For higher frequencies above ca 1150 Hz a reduction in the sound pressure can be observed. The effect in this particular example is greatest for higher frequencies and it can be observed that sound pressure does not exceed 100 dB(A) for any frequencies measured.

The diagram is merely intended to illustrate the effect of the inventive system and is not to be seen as a limiting example. The invention, depending on the design of the sound reduction device 1, is effective over a wider frequency range than illustrated in FIG. 4.

FIGS. 2 and 4 relate to an air intake duct in a vehicle engine. This is merely an illustrative example and is not intended to be limiting for the application of the invention. Alternative applications wherein similar effects can be achieved can for instance be in channels in a ventilation system or in a system comprising a pump pumping a gaseous medium.

As will be realized, the disclosure is capable of modification in various obvious respects, all without departing from the scope of the appended claims. Accordingly, the drawings and the description are to be regarded as illustrative in nature, and not restrictive.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A sound reduction system comprising:
a sound reduction device including a supporting structure, a frame configured to be supported by the supporting structure, and a sound reducing material configured to be supported by the frame, wherein the supporting structure is a closed structure, and the frame is positionable in the supporting structure such that at least a portion of the sound reducing material is located inside of the supporting structure, and wherein the supporting structure includes multiple openings and the frame includes multiple protrusions that are each receivable in a respective opening of the supporting structure to fasten the frame to the supporting structure; and a channel in which a gaseous medium is flowable;

wherein the sound reduction device is mountable inside the channel to position the sound reducing material inside the channel, such that the frame and the sound reducing material extend beyond the supporting structure upstream and downstream of the supporting structure.

2. The sound reduction system according to claim 1 wherein the sound reducing material is positionable in the frame.

3. The sound reduction system according to claim 2 wherein the supporting structure comprises a collar.

4. The sound reduction system according to claim 1 wherein the sound reduction device is removably mountable inside the channel.

5. The sound reduction system according to claim 2 wherein the sound reducing material comprises a solid member placed in the frame and/or the sound reducing material comprises a fiber mat placed in the frame.

6. The sound reduction system according to claim 2 wherein the sound reduction device further comprises a fastening arrangement attached to the frame for keeping the sound reducing material from escaping from the frame.

7. The sound reduction system according to claim 2 wherein the sound reduction device is configured to be disassembled.

8. The sound reduction system according to claim 1 wherein the sound reducing material is one of or a combination of glass fiber, polar fleece or polyurethane.

9. The sound reduction system according to claim 2 wherein the frame is aerodynamically shaped to reduce pressure drop of the gaseous medium over the frame.

10. The sound reduction system according to claim 9 wherein a cross-section of the frame is wing-shaped.

11. The sound reduction system according to claim 2 wherein the supporting structure and frame are made of a plastic and/or a metal.

12. The sound reduction system according to claim 2 wherein the supporting structure and the frame are made of the same material as the channel.

13. The sound reduction system according to claim 1 wherein the channel is configured to receive the gaseous medium above atmospheric pressure, at atmospheric pressure or below atmospheric pressure.

14. A vehicle comprising the sound reduction system according to claim 1, wherein the channel is an air intake channel.

15. The sound reduction system according to claim 1 further comprising a resonator disposed outside of the channel, wherein the channel includes multiple resonator openings that open to the resonator, and wherein the sound reducing material extends over at least some of the resonator openings when the sound reduction device is mounted inside the channel.

16. A method for reducing sound in a channel wherein a gaseous medium is flowable, the method comprising:

providing a sound reduction device comprising a supporting structure, a frame configured to be supported by the supporting structure, and a sound reducing material configured to be supported by the frame, wherein the supporting structure includes multiple openings and the frame includes multiple protrusions that are each receivable in a respective opening of the supporting structure;

snap fitting the frame together with the supporting structure; and mounting the sound reduction device inside the channel to position the sound reducing material inside the channel, such that the frame and the sound reducing material extend beyond the supporting structure upstream and downstream of the supporting structure.

17. A sound reduction system comprising:

a sound reduction device including a supporting structure, a frame configured to be supported by the supporting structure, and a sound reducing material configured to be supported by the frame, wherein the supporting structure is a closed structure, and the frame is positionable in the supporting structure such that at least a portion of the sound reducing material is located inside of the supporting structure, and wherein the supporting structure includes multiple openings and the frame includes multiple protrusions that are each receivable in a respective opening of the supporting structure to fasten the frame to the supporting structure; and a channel in which a gaseous medium is flowable, the channel including multiple resonator openings that are alignable with a resonator that is arrangeable outside of the channel and that has a hollow chamber;

wherein the sound reduction device is mountable inside the channel such that the sound reducing material is positionable inside the channel and over at least some of the resonator openings.

18. The sound reduction system according to claim 17 wherein the sound reducing material is positionable in the frame.

* * * * *